US009723785B2

(12) United States Patent
Ritter

(10) Patent No.: US 9,723,785 B2
(45) Date of Patent: Aug. 8, 2017

(54) HEADER LATCH MECHANISM FOR AGRICULTURAL VEHICLE

(71) Applicant: DEERE & COMPANY, Moline, IL (US)

(72) Inventor: Aaron S. Ritter, Milan, IL (US)

(73) Assignee: Deere & Company, Moline, IL (US)

( * ) Notice: Subject to any disclaimer, the term of this patent is extended or adjusted under 35 U.S.C. 154(b) by 96 days.

(21) Appl. No.: 14/473,844

(22) Filed: Aug. 29, 2014

(65) Prior Publication Data

US 2016/0057930 A1     Mar. 3, 2016

(51) Int. Cl.
*A01D 41/16*     (2006.01)
*A01D 41/06*     (2006.01)

(52) U.S. Cl.
CPC ............ *A01D 41/16* (2013.01); *A01D 41/06* (2013.01)

(58) Field of Classification Search
CPC ........ A01D 41/06; A01D 41/16; E02F 3/8152
See application file for complete search history.

(56) References Cited

U.S. PATENT DOCUMENTS

| | | | | |
|---|---|---|---|---|
| 3,412,534 A | * | 11/1968 | Teale | A01D 41/16 56/15.6 |
| 3,488,930 A | * | 1/1970 | Feldmann | A01D 41/16 56/11.9 |
| 3,599,402 A | * | 8/1971 | Heising | A01D 41/16 56/472 |
| 4,276,760 A | * | 7/1981 | Nolin | E05B 59/00 292/21 |
| T101,206 I4 | | 11/1981 | Ralston et al. | |
| 4,444,000 A | * | 4/1984 | Enzmann | A01D 41/16 56/14.6 |
| 4,677,814 A | * | 7/1987 | Anderson | A01D 41/16 172/272 |
| 5,203,738 A | * | 4/1993 | Busse | A01D 41/16 460/119 |
| 5,666,794 A | | 9/1997 | Vought et al. | |
| 6,519,923 B1 | * | 2/2003 | Cooksey | A01B 71/08 56/14.9 |

(Continued)

FOREIGN PATENT DOCUMENTS

DE     2263839 A1     7/1974
DE     4412116 A1     10/1995

(Continued)

OTHER PUBLICATIONS

European Patent Office, Extended European Search Report for European Patent Application No. 15178251.3-1655 mailed Jan. 18, 2016.

*Primary Examiner* — Robert Pezzuto
*Assistant Examiner* — Adams Behrens
(74) *Attorney, Agent, or Firm* — Lorenz & Kopf, LLP

(57) ABSTRACT

A latching mechanism for securing a header to an agricultural vehicle has latching pins located on opposite sides of a centerline of the vehicle. The latching pins are movable between latched and unlatched positions from the same side of the machine. As one example, the harvester is an agricultural combine harvester and the header mounts to a feederhouse. The latching mechanism can be mounted to the feederhouse and moved into and out of engagement with the header to retain or remove the header.

10 Claims, 6 Drawing Sheets

(56) References Cited

U.S. PATENT DOCUMENTS

| | | | |
|---|---|---|---|
| 2003/0172637 A1* | 9/2003 | Watts | A01D 41/16 56/14.7 |
| 2008/0006014 A1* | 1/2008 | Guske | A01B 71/063 56/15.6 |
| 2008/0205978 A1* | 8/2008 | Johnson | A01D 41/16 403/324 |
| 2008/0211239 A1* | 9/2008 | Keller | E05B 47/0002 292/164 |
| 2008/0256914 A1* | 10/2008 | Ricketts | A01D 41/16 56/10.8 |
| 2008/0271425 A1* | 11/2008 | Ricketts | A01D 41/16 56/15.6 |
| 2010/0011729 A1* | 1/2010 | Salley | A01D 41/16 56/14.5 |
| 2012/0189374 A1 | 7/2012 | Lanting et al. | |
| 2012/0317951 A1* | 12/2012 | Vereecke | A01D 41/16 56/14.9 |
| 2013/0192187 A1* | 8/2013 | Boyd, III | A01D 75/28 56/12.7 |
| 2013/0219846 A1* | 8/2013 | Verhaeghe | A01D 41/16 56/16.4 R |

FOREIGN PATENT DOCUMENTS

| | | | |
|---|---|---|---|
| EP | 1346625 | A1 | 9/2003 |
| EP | 1964462 | A1 | 9/2008 |

\* cited by examiner

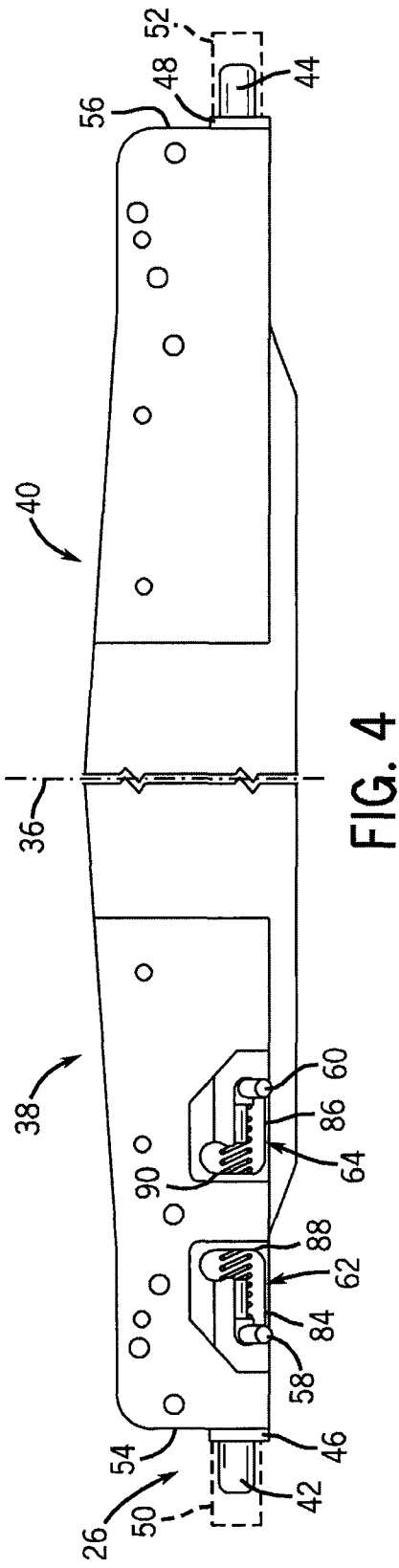
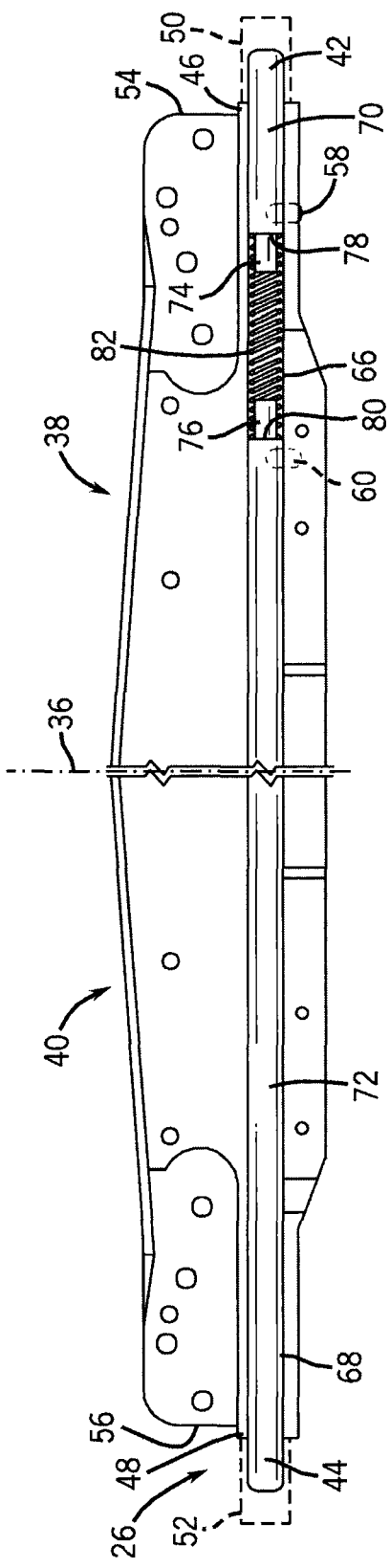

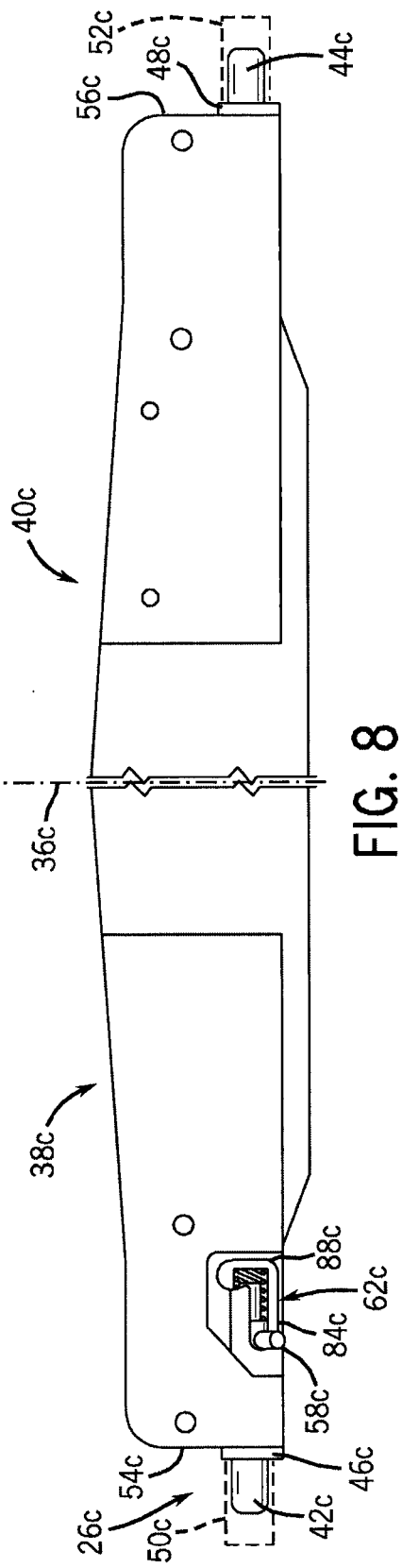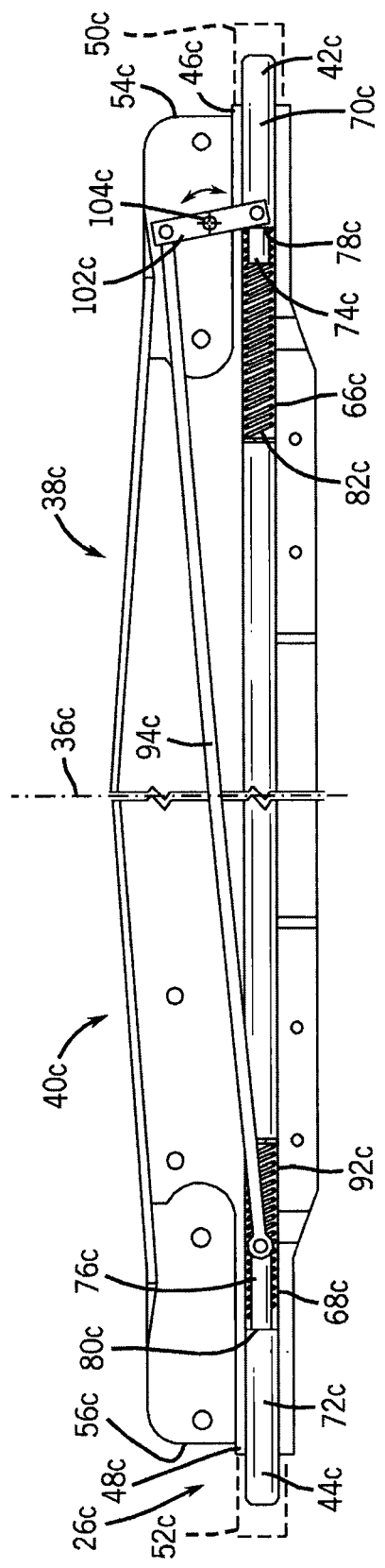

HEADER LATCH MECHANISM FOR AGRICULTURAL VEHICLE

CROSS-REFERENCE TO RELATED APPLICATION(S)

Not Applicable.

STATEMENT OF FEDERALLY SPONSORED RESEARCH OR DEVELOPMENT

Not applicable.

FIELD OF THE DISCLOSURE

This disclosure relates generally to agricultural vehicles, and in particular to latch mechanisms for coupling headers to agricultural harvesters and the like.

BACKGROUND OF THE DISCLOSURE

Agricultural vehicles come in various forms for cutting and processing crop material. For example, windrowers are dedicated machines for cutting crops from the ground, as may be useful to allow subsequent baling of the crop material. Combine harvesters combine the three separate operations of crop reaping, threshing, and winnowing into a single machine. Combine harvesters may be configured as multi-crop machines that can process different crops by interchanging the header mounted at the front of the machine. For example, a grain header can be attached for harvesting wheat and a corn header can be attached for harvesting corn.

Modern headers, particularly in the case of combine harvesters, can be large and lengthy in order to cut a wide swath through the crop. For example, the long dimension of corn headers for modern combine harvesters may be on the order of ten times the width of the feederhouse to which the headers attach and through which the cut crop material is fed into the machine.

In certain agricultural vehicles, latching pins may be provided on each side of the header mounting structure, such as the feederhouse of an agricultural combine harvester, to secure the header to the vehicle. Automated latching pins may be utilized in some vehicles, but can be expensive and complex. Further, manually latching and unlatching latching pins may require the operator to walk around the vehicle or the header in order to reach both pins, which diminishes productivity and convenience.

SUMMARY OF THE DISCLOSURE

A mechanism for the actuation of a pair of latching pins is disclosed, such that latching and unlatching of both of the latching pins can be executed from a single side of a feederhouse of a combine.

According to one aspect of the disclosure an agricultural vehicle has a header removably attachable to a header mount. The latching mechanism has at least two latching pins each located on opposite sides of a centerline of the vehicle, at least one latch actuator located on one side of the vehicle centerline and coupled to the at least two latching pins. The at least two latching pins are moved by the at least one latch actuator at least one of into and out of a latched position in which the at least two latching pins interfere with removal of the header from the vehicle.

In some embodiments there may be two latching pins. Further, two actuators may be provided, such that each latching pin might be coupled independently to an actuator. A link may be provided to couple one of the actuators with one of the latching pins. A spring may be provided for biasing the latching pins towards a latched position.

In other examples, one latching pin may be longer than the other latching pin and may extend between opposite sides of the centerline. There may be only one actuator which controls both latching pins. The latching pins may be connected to one another through a linkage.

Another aspect of the disclosure provides an agricultural vehicle, such as an agricultural combine harvester or windrower, incorporating the disclosed latching mechanism.

These and other features and advantages of the present disclosure will become clear to a person skilled in the art after reading the following detailed description and in consideration of the drawings.

BRIEF DESCRIPTION OF THE DRAWINGS

FIG. 4 is a rear view of a first example latching mechanism of the feederhouse of FIG. 2.

FIG. 5 is a front cross-sectional view of the latching mechanism of FIG. 4.

FIG. 8 is a rear view of a third example latching mechanism of the feederhouse of FIG. 2.

FIG. 9 is a front cross-sectional view of the latching mechanism of FIG. 8.

Like reference numerals in the drawings indicate like components, parts, or operations.

DETAILED DESCRIPTION

The following describes one or more example embodiments of the disclosed latching mechanism for securing the header of an agricultural vehicle, as shown in the accompanying figures of the drawings described briefly above. Various modifications to the example embodiments may be contemplated by one of skill in the art.

Figure 1:
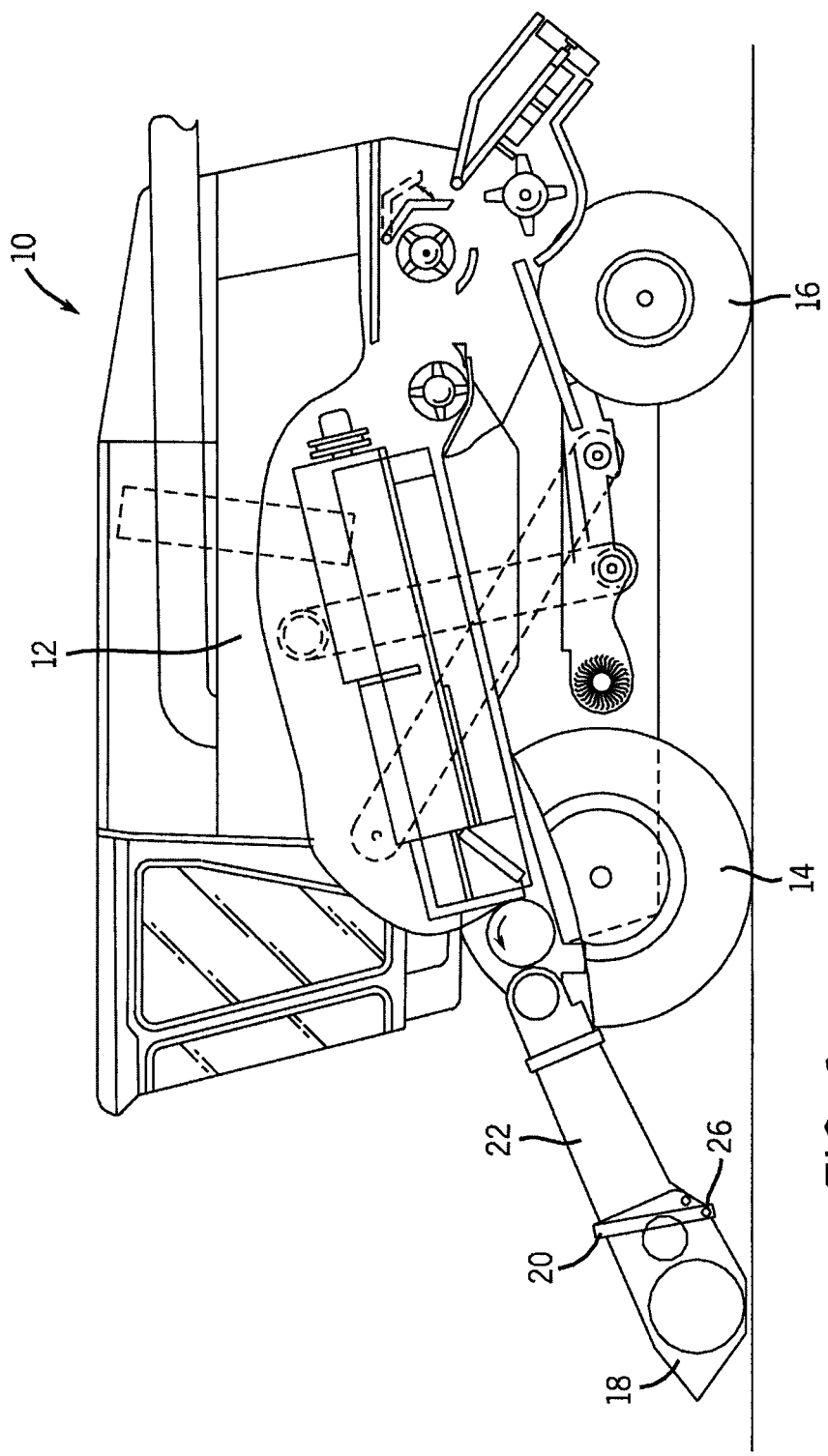
FIG. 1 is a side view of an example agricultural vehicle in the form of an agricultural combine harvester.

A side view of an example agricultural vehicle in the form of an agricultural combine harvester 10 is shown in FIG. 1. An agricultural vehicle can include any powered or non-powered vehicle used to cut or process crop, and thus aspects of this disclosure are not limited to the example agricultural combine shown. Moreover, the agricultural vehicle can have any of a variety of headers, such as various rotary or auger draper platforms or corn or grain header platforms.

The harvester 10 has a main body 12 supported by a pair of front wheels 14 and pair of rear wheels 16. The harvester 10 has a header 18 removably attached with a mounting assembly 20 to a feederhouse 22 at the front of the harvester 10. The feederhouse 22 may be rotatably coupled to the harvester 10 about pivot axis 24 (see FIG. 2), such that the feederhouse 22 can be pivoted upward to raise the height of the header 18 above the ground, or lowered to bring the header 18 closer to the ground. Generally, the feederhouse 22 transports harvested crop from the header 18 to the harvester 10 for further processing.

Figure 2:
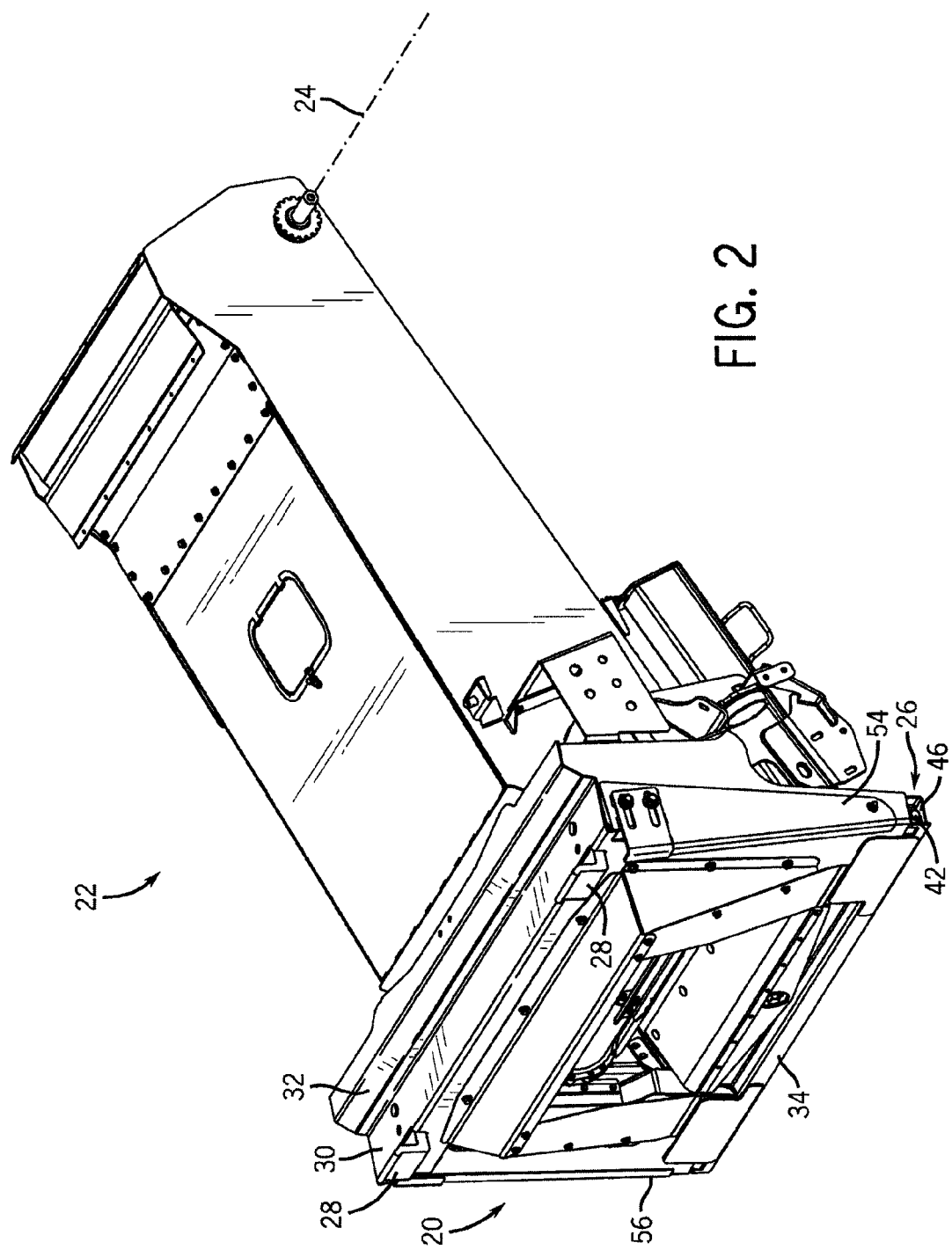
FIG. 2 is a perspective view of a feederhouse for the harvester of FIG. 1.

Referring also to FIG. 2, the mounting assembly 20 has a latching mechanism 26, a pair of mounting hooks 28, an upper support bar 30 (configured, as depicted, as a sill plate having a backstop 32), and a lower support bar 34. When the header is supported by the feederhouse 22, a portion of the header 18 rests on top of the upper support bar 30. The pairs of hooks 28, restrict forward movement of the header 18 relative to the feederhouse 22, while the backstop 32 restricts rearward movement of the header 18 relative to the feederhouse 22. The lower support bar 34 supports a bottom portion of the header 18 and prevents the header 18 from rotating rearward (i.e., counterclockwise, from the perspective of FIG. 1) towards the feederhouse 22. The latching mechanism 26 maintains the header 18 secured to the feederhouse 22 so that the header 18 generally cannot move or rotate relative to the feederhouse 22 while the latching mechanism 26 is engaged. For example, the header 18 may have a left cavity 50 and a right cavity 52 for accepting a left latching pin 42 and a right latching pin 44, respectively, of the latching mechanism 26. (It will be understood, because the header 18 may not be fixedly attached to the feederhouse 22 at the upper support bar 30, that the header 18 may still move somewhat with respect to the feederhouse 22, even when the latching mechanism 26 is engaged.)

Forward and rearward references are used herein as a matter of convenience and are determined by the normal direction of travel for the harvester 10, with the forward direction being generally to the left from the perspective of FIG. 1. In this light, "left" and "right" (and, generally, the "lateral" direction), from the perspective of the harvester 10, are determined by standing at the rear of the harvester 10 and facing the forward end in the normal direction of travel. Upward and downward directions are relative to the ground. A reference plane 36 (see, e.g., FIG. 4) passes perpendicular to the pivot axis 24 and separates a left side 38 from a right side 40 of the harvester 10 (and other components). In the illustrated the example, the reference plane 36 is disposed along a longitudinal centerline of the harvester 10.

Figure 3:
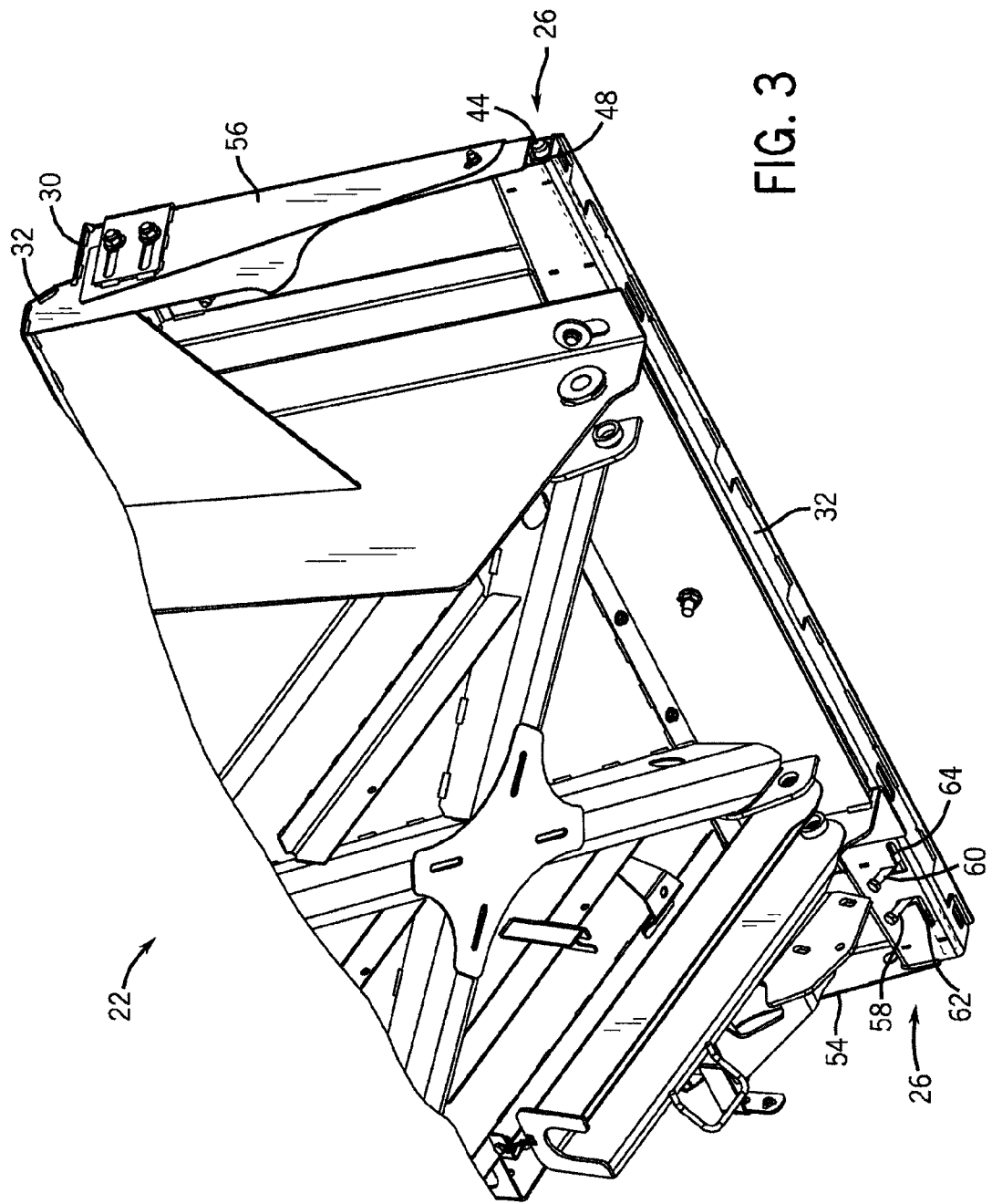
FIG. 3 is an enlarged partial rear perspective view of the feederhouse of FIG. 2.

Referring to FIG. 3 an enlarged lower rear perspective view of a portion of the feederhouse 22 is shown for a first example of the latching mechanism 26. The latching mechanism 26 may include a portion of the lower support bar 34, with left 46 and right 48 sleeves disposed within the lower support bar 34 and left 42 and right 44 latching pins may be disposed within the respective left 46 and right 48 sleeves. The sleeves 46 and 48 may be permanently attached to the mounting assembly 20, such as through welding, or may be removably located within the mounting assembly 20. To secure the header 18 to the feederhouse 22, the left 42 and right 44 latching pins interface with the header 18, such as with the left 50 and right 52 cavities to generally restrict movement of the header 18 with respect to the lower support bar 34. The latching pins 42 and 44 are actuated, respectively, using left 58 and right 60 actuator handles, which may take the form of pin-like structures disposed within first 62 and second 64 slots.

Generally, the various latching pins disclosed herein may be moved within the associated latching mechanism with a latch actuator. Generally, a latch actuator is a feature connected to the latching pin that may be engaged (e.g., mechanically, magnetically, or otherwise) to move the latching pin between latched and unlatched positions. In various depicted embodiments, the latch actuators may be configured as actuator handles, which an operator may manually engage to move the latching pins. This may allow for relatively robust and low-cost design of the relevant latching mechanism. In certain embodiments, however, other configurations for the latch actuators may be possible.

Referring now also to FIGS. 4 and 5, details of the latching mechanism 26 are shown from a rear perspective and front, sectional perspective, respectively. The mounting assembly 20 may have a left bore 66 extending inward through the left sleeve 46 located towards the left side wall 54 of the mounting assembly 20, with respect to the reference plane 36. Similarly, a right bore 68 extends through the right sleeve 48 located towards the right side wall 56 of the mounting assembly, with respect to the reference plane 36. The left 66 and right 68 bores may be separate axially aligned bores or part of a single continuous bore extending through the entire mounting assembly 20 in the left to right direction.

The left 42 and right 44 latching pins are disposed in the respective sleeves 46 and 48. The left 42 and right 44 latching pins may slide laterally left and right between a latched position, in which the left 42 and right 44 latching pins extend outward beyond the feederhouse 22 and interface with the header 18 (as shown in FIG. 5), and an unlatched position, in which the left 42 and right 44 latching pins are fully, or at least mostly, retracted within the sleeves 46 and 48 inside of the feederhouse 22 so as not to engage or otherwise interface with the header 18. In the embodiment depicted, with the latching pins 42 and 44 in the latched position, the latching pins 42 and 44 engage the cavities 50 and 52, respectively, in order to secure the header 18 to the feederhouse 22. With the latching pins 42 and 44 in the unlatched position, the latching pins 42 and 44 do not engage the cavities 50 and 52, such that the header 18 may be removed from the feederhouse.

As shown in FIG. 5, the right latching pin 44 may longer than the left latching pin 42. For example, the right latching pin 44 may extend within the left 66 and right 68 bores entirely through the right side 40 and at least partially into the left side 38 of the support bar 34. In that case, the left latching pin 42 extends only within the left bore 66 along the left side 38 of the support bar 34. The longer length of the right latching pin 44 allows both the left 42 and right 44 latching pins to be actuated on the same side of the reference plane 36, specifically from the left side 38 in the illustrated example. (It will be understood, for this and other embodiments, that an opposite configuration is also possible, in which both latching pins 42 and 44 may be actuated from the right side 40.)

The left 42 and right 44 latching pins may each have a main body portion 70 and 72, with spring retainers 74 and 76, respectively, disposed along an axially inward portion of their lengths. The spring retainers 74 and 76 have a diameter less than the diameter of the main body portions 70 and 72. Shoulder 78 and 80 may extend perpendicularly or at an angle between the main body portions 70 and 72 and the spring retainers 74 and 76, respectively. The spring retainers 74 and 76 may be located towards the lateral ends of the latching pins 42 and 44 closest to the reference plane 36. A helical compression spring 82 may be disposed between the latching pins 42 and 44, with the ends of the spring 82 disposed over the springs retainers 74 and 76 and seated against the shoulders 78 and 80. Alternatively, the latching mechanism 26 may have two (or more) compression springs (e.g., as shown in the embodiments depicted in FIGS. 7 and 9), which may abut each other or may be retained separately against a surface at the left 38 and/or right 40 sides.

At the left side 38 are the first 62 and second 64 slots associated with the respective left 42 and right 44 latching pins. As shown in FIG. 4, the first 62 and second 64 slots may be laterally spaced from one another. Each slot 62 and 64 has a lateral section 84 and 86, respectively, extending through an outer wall at the left side 38 of the mounting assembly 20 and inward of the left bore 66. The lateral sections 84 and 86 may generally extend in a parallel direction with the latching pins 42 and 44 and the sleeves 46 and 48. The slots 62 and 64 each also have a transverse section 88 and 90, respectively, extending upward (or downward) from one end of the lateral sections 84 and 86. The transverse sections 88 and 90 may also extend slightly laterally at their ends, as may be useful for holding the latching pins 42 and 44 in the unlatched position.

The latching pins 42 and 44 have the associated actuator handles 58 and 60 extending radially outward, perpendicularly or at an angle, from the main bodies 70 and 72. The actuator handles 58 and 60 may be moved within the slots 62 and 64, and in particular along the lateral sections 84 and 86, to move the latching pins 42 and 44 between the latched and unlatched positions. The actuator handles 58 and 60 can also travel upward and downward through the transverse sections 88 and 90, when in the fully unlatched position, by rotating the latching pins 42 and 44 about their axes, to respectively lock and unlock the latching pins 42 and 44 in the unlatched position. In the embodiment depicted, when the actuator handles 58 and 60 are disposed within the transverse sections 88 and 90 of the slots 62 and 64, the actuator handles 58 and 60 retain the latching pins 42 and 44 in an unlatched position. In certain embodiments, the slots 62 and 64 may be alternatively configured such that the transverse sections 88 and 90 may be used to retain the latching pins 42 and 44 in a latched position.

The operation of latching and unlatching the header 18 to the mounting assembly 20 will now be described. With the header 18 already installed on the harvester 10, the operator may rotate the feederhouse 22 downward until the header 18 is resting on the ground. The operator can then exit the harvester 10 through an access side (not shown) of the harvester 10. The header 18 may then be detached from the mounting assembly 20 of the feederhouse 22 by moving the right latching pin 44 towards the left with the actuator handle 60. For example, the operator may stand at the left side 38 of the feederhouse and manually slide the actuator handle 60 along the slot 64. This may cause the latching pin 44 to travel through the lateral section 86 of the slot 64, causing the spring 82 to compress and the right latching pin 44 to exit the right cavity 52 of the header 18. Once the actuator handle 60 has traveled the length of the lateral section 86, then the actuator handle 60 can be moved upward through transverse section 90 of the slot 64, which causes the right latching pin 44 to rotate. The spring 82 exerts a force against the right latching pin 44, pushing it outward (towards the right in FIG. 4). The short lateral extension of the transverse section 90 aids in maintaining the right latching pin 44 in the unlatched position.

Similarly, the left latching pin 42 may be moved from a latched position to an unlatched position by moving the left latching pin 42 (to the right in FIG. 4), causing the spring 82 to compress and the left latching pin 42 to exit the left cavity 50 of the header 18. For example, still from the left side 38 of the feederhouse 22, the operator may manually slide the actuator handle 58 along the slot 62. In this way, the actuator handle 58 may be moved laterally along the lateral section 84 and then upward within the transverse section 88 of the slot 62. The spring 82 then urges the actuator handle 58 into the side wall of the transverse section 88 of the slot 62 to prevent axial movement of the left latching pin 42 and thereby lock the latching pin 42 in the unlatched position.

With both latching pins 42 and 44 in the unlatched position, the header 18 is retained on the mounting assembly 20 only through the pair of mounting hooks 28. The operator may then rotate the feederhouse 22 farther downward, until the weight of the header 18 is supported by the ground and the pair of hooks 28 are disposed below the mounting bar (not shown) of the header 18. The harvester 10 can then be moved rearward away from the now detached header 18. It will be appreciated that the operator can unlatch both the left and right latching pins 42 and 44 from a single side of the harvester 10, for example from the operator's access side of the harvester 10. Further, it will be understood that the latching pins 42 and 44 may be unlatched in any order, or may be unlatched simultaneously, by an operator standing on one side of the harvester 10.

To attach the header 18 to the feederhouse 22, the operator can move the harvester 10 forward with the feederhouse 22 rotated downward, such that the pair of mounting hooks 28 are below the mounting bar (not shown) of the header 18. After aligning the hooks 28 with the mounting bar, the operator can then rotate the feederhouse 22 upward to bring the pair of hooks 28 in contact with the mounting bar (not shown) and thereby lift the header 18 with the feederhouse 22. As the header 18 is lifted by the feederhouse 22, the header 18 may rotate downward (i.e., counterclockwise, from the perspective of FIG. 1), such that the cavities 50 and 52 (or other similar features) of the header 18 are aligned with the latching pins 42 and 44. The operator can then exit the harvester 10 on the operator access side to finish attaching the header 18 to the mounting assembly 20 by engaging the latching pins 42 and 44. Specifically, while standing on the left side 38 of the feederhouse 22, the operator can manipulate the actuator handle 60 to travel down through the transverse section 90 of the slot 64 and into the lateral section 86. The operator can then move the actuator handle 60 laterally outward or simply let go of the actuator handle 60 to allow the spring 82 to push the right latching pin 44 outward into the right cavity 52 of the header 18 (i.e., into the latched position).

Similarly, the operator can move the left actuator handle 58 downward within the transverse section 88 of the slot 62 until it reaches the lateral section 84. The operator can then either let go of the left latching pin 42 or manually move the left latching pin 42 to the left, to manipulate the left latching pin 42 to into the left cavity of the header 18 (i.e., into the latched position). Again, it will be understood that the latching pins 42 and 44 may be moved to the respective latched positions in any order, or may be latched simultaneously, by an operator standing on one side of the harvester 10.

Figure 6:
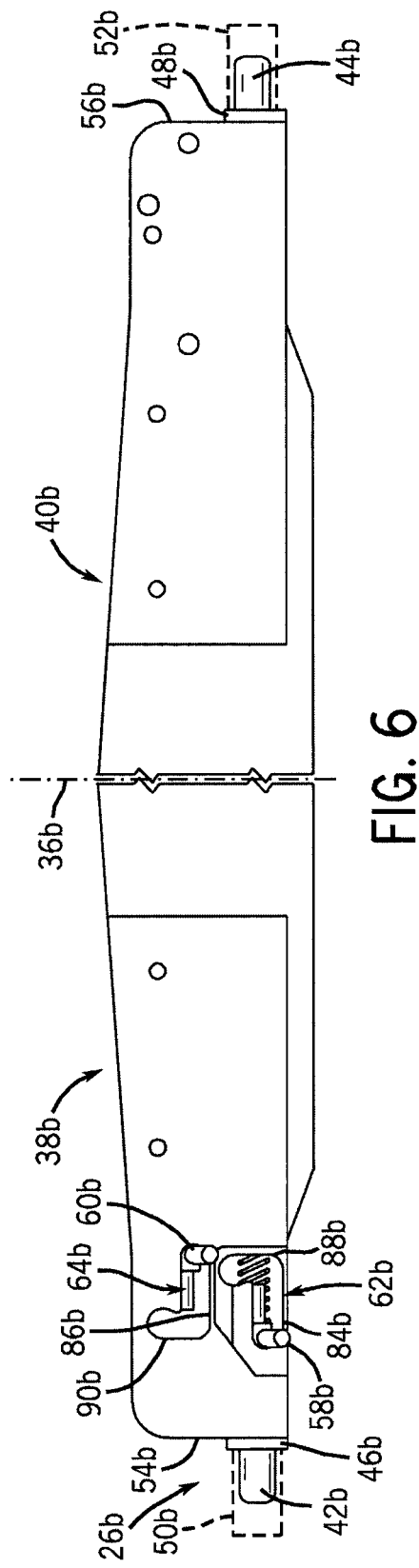
FIG. 6 is a rear view of a second example latching mechanism of the feederhouse of FIG. 2.
Figure 7:
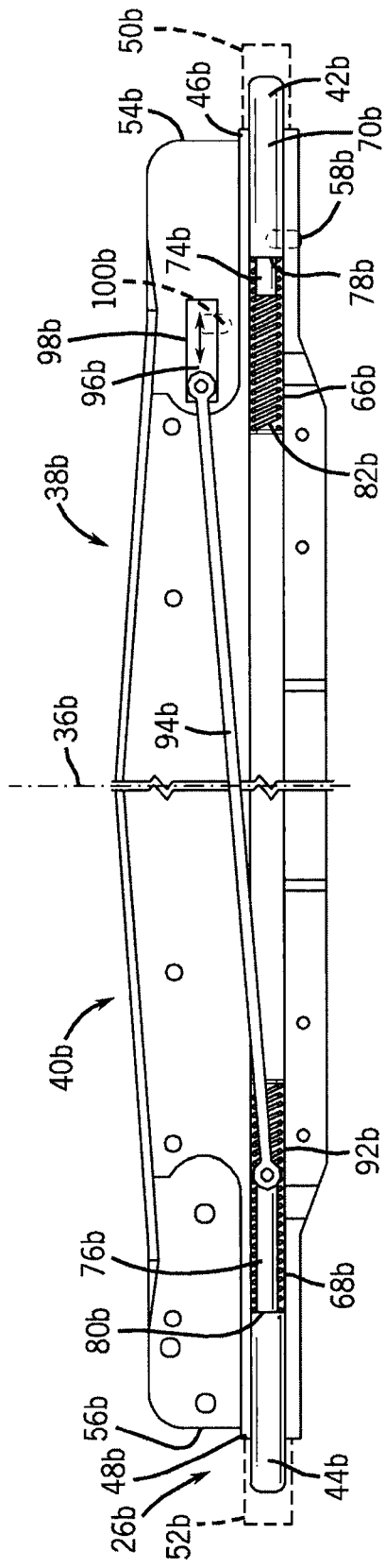
FIG. 7 is a front cross-sectional view of the latching mechanism of FIG. 6.

A second example latching mechanism 26b is shown in FIGS. 6 and 7. The latching mechanism 26b shares several similar components with the first example, and thus like element numbers are used herein with the suffix "b". For example, the latching mechanism 26b is arranged at the left 38b and right 40b sides of a reference plane 36b with left 66b and right 68b bores, left 42b and right 44b latching pins, first 62b and second 64b slots, and spring 82b. The latching mechanism 26b additionally has a second spring 92b for biasing the right latching pin 44b towards a latched position disposed within the right bore 68b and abutting against the shoulder 80b of the right latching pin 44b.

A linkage bar 94b is pivotally attached on one distal end of the bar 94b to the spring retainer 76b of the right latching pin 44*b* and on a second distal end of the bar 94*b* to a third pin 96*b*. The spring retainer 76*b* of the right latching pin 44*b* may be longer then the spring retaining 76 to provide additional area to connect the linkage bar 94*b*. The third pin 96*b*, like the latching pin 42*b*, is disposed on the left side 38*b* of the latching mechanism 26*b*, and is configured to move laterally left and right in a third pin bore 98*b* in order to latch and unlatching the right latching pin 44*b*. The third pin 96*b* has a third actuator handle 100*b* for retaining the right latching pin 44*b* in an unlatched position. The third actuator handle 100*b* extends perpendicularly, or alternatively at an angle, from the third pin 96*b*, and passes through the second slot 64*b*. The second slot 64*b* and the third pin bore 98*b* may both be transversely spaced from the left bore 66*b* and the first slot 62*b*. The right latching pin 44*b* may be shorter than the right latching pin 44*b* of the first example, as shown in FIGS. 5 and 7, since the linkage bar 94*b* connects the right latching pin 44*b* to the third pin 96*b* and third actuator 100*b* at the left side 38*b*. For example, the right latching pin 44*b* may extend only within the right bore 68*b*, with the linkage bar 94*b* connecting the right latching pin 44*b* to the third pin 96*b* for latching and unlatching the right latching pin 44*b* and for locking and unlocking the right latching pin 44*b*.

Operation of the right latching pin 44*b* will now be described. The right latching pin 44*b* may be moved laterally from a latched position to an unlatched position by moving the third actuator handle 100*b* of the actuator 96*b* laterally along the lateral portion 86*b* of the second slot 64*b* towards the left side wall 54*b*. This causes the linkage bar 94*b* and right latching pin 44*b* to move to the left while compressing the spring 82*b*. Then, the third actuator handle 100*b* can be moved transversely upward along the transverse portion 90*b* of the second slot 64*b* to lock the right latching pin 44*b* in the retained position.

To move the right latching pin 44*b* to the latched position again, the actuator handle 100*b* must be moved transversely downward from the transverse portion 90*b* to the lateral portion 86*b* of the second slot 64*b* to unlock the right latching pin 44*b*. The right latching pin 44*b* can then be moved to the right, decompressing the spring 92*b*, until the right latching pin 44*b* is in its latched position, with the right latching pin 44*b* being fully extended.

It will be appreciated that since the left latching pins 42 and 42*b*, actuator handles 58 and 58*b*, and the first slots 62 and 62*b* are configured similarly in the latching mechanisms 26 and 26*b*, latching and unlatching of the left latching pin 42*b* may proceed similarly to latching and unlatching of the left latching pin 42, as described above.

A third example latching mechanism 26*c* is shown in FIGS. 8 and 9. The latching mechanism 26*c* shares several components with the other illustrated examples, and thus like element numbers are used for like elements, but with the suffice "c". The latching mechanism 26*c* allows the operator to unlatch both the left 42*c* and right 44*c* latching pins from one side of the harvester 10, and simultaneously with a single actuation.

The third example includes similar latching pins 42*c* and 44*c* as the latching pins 42*b* and 44*b* of the second example. A linkage bar 94*c* is pivotally connected on a first distal end of the linkage bar 94*c* to the right spring retainer 76*c* of the right latching pin 44*c* and on a second distal end of the linkage bar 94*c* to a first distal end of a second linkage bar 102*c*. The second linkage bar 102*c* is pivotally connected on a second distal end of the second linkage bar 102*c* to the left spring retainer 74*c* of the left latching pin 42*c*. The second linkage bar 102*c* is pivotally attached to the left side 38*c* of the latching mechanism 26*c* at a pivot point 104*c* between the first and second distal ends of the linkage bar 102*c* (e.g., at the half way point between these two distal ends). In the latching mechanism 26*c*, as depicted, the right latching pin 44*c* does not have its own dedicated actuator for latching and unlatching and locking and unlocking the right latching pin 44*c*, but rather is operated through actuation of the left latching pin 42*c*.

Operation of the left and right latching pins 42*c* and 44*c* will now be described. The operator can engaged a left actuator handle 58*c* in the same way as with the latching mechanisms 26 and 26*b* (as described above), in order to move the left latching pin 42*c* from a latched position to an unlatched position. The left actuator handle 58*c* is slid laterally along the lateral portion 84*c* of the first slot 62*c* until it reaches the transverse portion 88*c* of the first slot 62*c*, it is now in an unlatched position. While the left actuator handle 58*c* and left latching pin 42*c* are moving towards the right, the bottom of the second linkage bar 102*c* is also pulled to the right, causing the second linkage bar 102*c* to pivot in a clockwise manner about the pivot point 104*c*, from the perspective of FIG. 8. The pivoting of the second linkage bar 102*c* causes the portion of the linkage bar 102*c* that is connected to the linkage bar 94*c* to move to the left, thereby pulling the linkage bar 94*c* and the right latching pin 44*c* to the left as well. Accordingly, through the mechanical operation of the linkage bars 94*c* and 102*c*, moving the left latching pin 42*c* to the unlatched position also moves the right latching pin 44*c* to the unlatched position. As such, as with the latching mechanisms 26 and 26*b*, the latching mechanism 26*c* may be utilized to unlatch (or latch) both of the latching pins 42*c* and 44*c* from the same side of the feederhouse 22.

After reaching the unlatched position, the left actuator handle 58*c* may be moved upward along the transverse portion 88*c* of the slot 62*c* from an unlocked state to a locked state. While in the locked state, the left latching pin 42*c* cannot move towards the latched position, this also prevents the second linkage bar 102*c* from rotating, which prevents the right latching pin 44*c* from moving towards its latched position. Accordingly, both of the latching pins 42*c* and 44*c* may also be locked (and unlocked) from the same side of the feederhouse 22.

To unlock and latch the left and right latching pins 42*c* and 44*c*, the operator can move the left actuator handle 58*c* downward through the transverse portion 88*c* of the first slot 62*c* to the lateral portion 84*c*, thus moving the left and right latching pins 42*c* and 44*c* from a locked state to an unlocked state. The left latching pin 42*c* is then free to move laterally along the left bore 66*c*, which in turn allows the second linkage bar 102*c* to rotate and the linkage bar 94*c* and the right latching pin 44*c* to move. Once unlocked, the left and right latching pins 42*c* and 44*c* can be moved automatically to their respective latched positions by the springs 82*c* and 92*c* decompressing, or through the operator manipulating the left actuator handle 58*c* to the left.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, components, operations, or arrangements, but do not preclude the presence or addition of one or more other features, components, operations or arrangements.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. In an agricultural vehicle (10) having a header (18) removably attachable to a header mount (20), a header latching mechanism configured to secure the header to the header mount, comprising:
   at least two latching pins (42, 44) arranged so that when the latching mechanism is mounted to the vehicle the at least two latching pins are located on opposite sides (38, 40) of a centerline (36) of the vehicle; and
   at least one latch actuator handle (58, 60) arranged to be located on one side of the vehicle centerline when the latching mechanism is mounted to the vehicle, the at least one latch actuator handle being coupled to the at least two latching pins one of directly and via a rigid linkage arrangement in which a first rigid link (94b, 94c) has an end connected directly to the at least one latch actuator handle;
   wherein the at least one latch actuator handle is configured for manual actuation and the at least two latching pins are moved by the at least one latch actuator handle at least one of into and out of a latched position in which the at least two latching pins interfere with removal of the header from the vehicle; and
   wherein one of the latching pins is longer (44) than another latching pin (42) and extends across the centerline so its ends are located at opposite sides of the centerline.

2. The latching mechanism of claim 1, wherein there are two latching pins.

3. The latching mechanism of claim 2, wherein there are two latch actuator handles each coupled to one of the latching pins to move the associated latching pin independently of the other latching pin.

4. The latching mechanism of claim 2, further including at least one spring (82, 92) biasing the latching pins into the latched position.

5. The latching mechanism of claim 2, wherein there is only one latch actuator handle (58c) which moves both of the latching pins.

6. The latching mechanism of claim 5, wherein the linkage arrangement includes a second rigid link (102c) connected to the first rigid link and coupling the latching pins together.

7. The latching mechanism of claim 6, wherein the second rigid link is pivotally coupled to one of the header and the header mount.

8. The latching mechanism of claim 1, where each latch actuator handle is disposed through an angled slot (62, 64) in which the associated latching pin is held into the latched position when the latch actuator handle is in a first portion of the slot.

9. An agricultural vehicle (10), comprising:
   a header (18);
   a header mount (20) removably attaching the header; and
   a latch mechanism (26) including:
       first and second latching pins (42, 44) each located on opposite sides (38, 40) of a centerline (36) of the vehicle; and
       at least one latch actuator handle (58, 60) located on one side of the vehicle centerline, the at least one latch actuator handle being coupled to the first and second latching pins one of directly and via a rigid linkage arrangement in which a first rigid link (94b, 94c) has an end connected directly to the at least one latch actuator handle;
   wherein the at least one latch actuator handle is configured for manual actuation and the first and second latching pins are moved by the at least one latch actuator handle into and out of a latched position in which the first and second latching pins interfere with removal of the header from the header mount; and
   wherein one of the latching pins is longer (44) than another latching pin (42) and extends across the centerline so its ends are located at opposite sides of the centerline.

10. An agricultural combine harvester (10), comprising: a feederhouse (22); a header (18) removably attached to the feederhouse; and a latch mechanism (26) mounted to the feederhouse and including: first and second latching pins (42, 44) each located on opposite sides (38, 40) of a centerline (36) of the harvester and arranged to fit into openings (50, 52) in the header; and at least one latch actuator handle (58, 60) located on one side of the harvester centerline, the at least one latch actuator handle being coupled to the first and second latching pins one of directly and via a rigid linkage arrangement in which a first rigid link (94b, 94c) has an end connected directly to the at least one latch actuator handle; wherein the at least one latch actuator is configured for manual actuation and the first and second latching pins are moved by the at least one latch actuator into and out of a latched position in which the first and second latching pins interfere with removal of the header from the feederhouse, wherein one of the latching pins is longer (44) than another latching pin (42) and extends across the centerline so its ends are located at opposite sides of the centerline.

* * * * *